(No Model.)
O. B. SHALLENBERGER.
APPARATUS FOR DETECTING GROUND CONNECTIONS IN ELECTRIC CIRCUITS.
No. 383,666. Patented May 29, 1888.
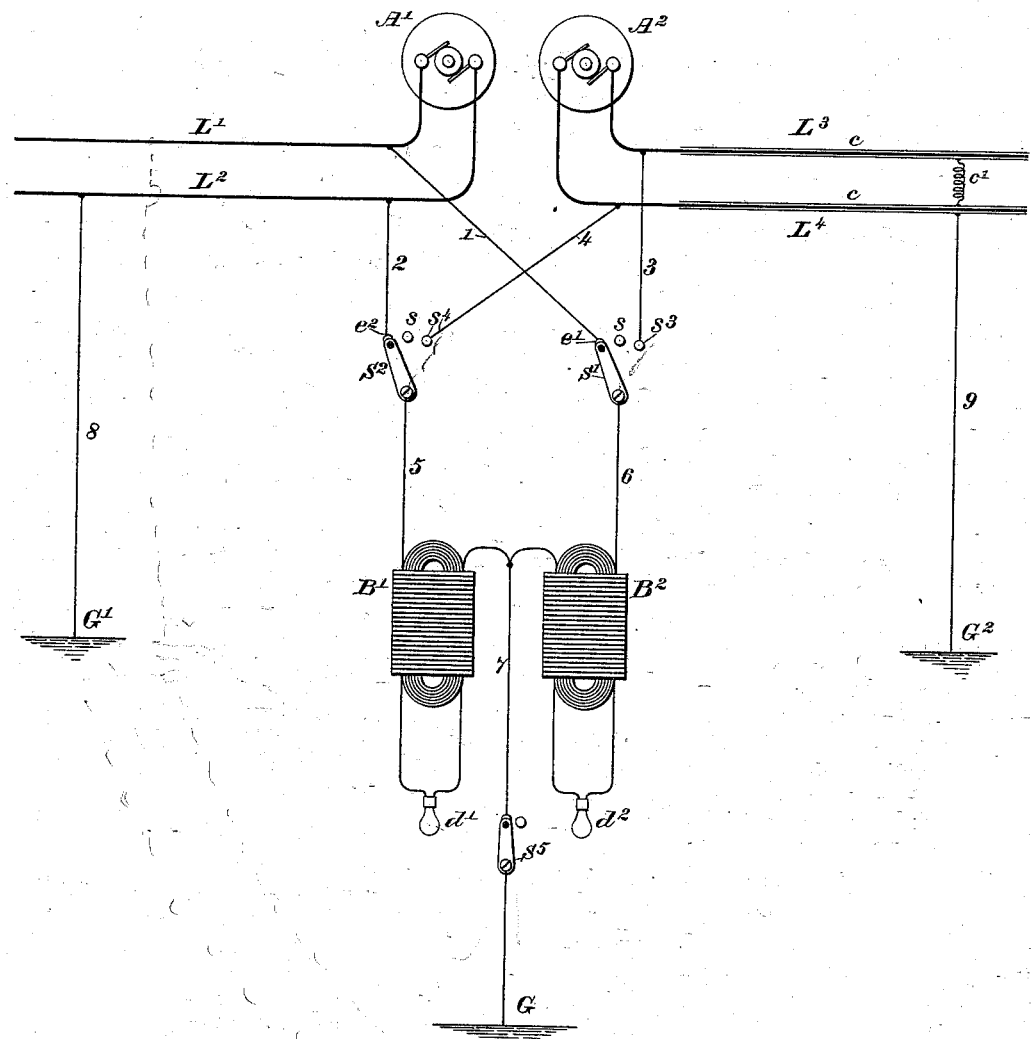

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

APPARATUS FOR DETECTING GROUND-CONNECTIONS IN ELECTRIC CIRCUITS.

SPECIFICATION forming part of Letters Patent No. 383,666, dated May 29, 1888.

Application filed September 1, 1887. Serial No. 248,470. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Testing Apparatus for Electric Circuits, of which the following is a specification.

The invention relates to the class of apparatus employed for detecting accidental short circuits or ground-connections in systems of electric circuits.

The object of the invention is to provide means for detecting and locating faults in conductors employed in systems of alternate-current electric distribution; and it relates especially to the circuits wherein metal-covered underground conductors are used.

The invention consists, generally, in placing two electric converters in circuits which may be completed from the respective poles of a generator or lines leading therefrom with the earth, and in applying to each an indicating device—such, for instance, as an incandescent electric lamp—included in their respective secondary circuits. In case there is a ground-connection with one of the lines, the converter connected with the corresponding line will be short-circuited, and the consequent variation in the light operated by the converter will indicate that such false connection is made.

The accompanying drawing is a diagram illustrating the general organization of apparatus.

Referring to the figure, $A'$ and $A^2$ represent two alternate-current electric generators. The generator $A'$ is provided with conductors $L'$ and $L^2$, leading from its respective poles, and likewise conductors $L^3$ and $L^4$ lead from the poles of the generator $A^2$. The conductors $L^3$ and $L^4$ are here represented as being covered by a sheathing, $c$, of metal—such, for instance, as lead—and when the conductors are underground these outer sheathings will, it is evident, be in electrical connection with each other, as indicated by the conductor $c'$.

The conductor $L'$ is connected by a conductor, 1, with a switch-point, $e'$, and the line $L^2$ is connected by a conductor, 2, with a switch-point, $e^2$. Switches $S'$ and $S^2$ are respectively applied to these points, and these switches are connected by conductors 5 and 6, respectively, through the primary coils of electric converters or inductoriums $B'$ and $B^2$. The conductors, after traversing the coils of the converters, are united with a conductor, 7, leading through a switch or circuit-closing device, $S^5$, to the earth at $G$. The secondary coils of the converters $B'$ and $B^2$ are respectively connected through translating devices— such, for instance, as incandescent electric lamps $d'$ and $d^2$.

It is evident when the generator $A'$ is operating and the lines $L'$ and $L^2$ are properly insulated a current will traverse the conductors 1 and 2, and therefore the lights $d'$ and $d^2$ will be equally illuminated. Should, however, one of the lines—$L^2$, for instance—be in any manner connected with the earth, as indicated at $G'$, by the conductor 8, then the converter $B'$ will be shunted, while an increased current, the amount of which is dependent upon the resistance of the earth-connection, will traverse the primary coil of the converter $B^2$, and thus increase the illumination of the device $d^2$. Had the ground-connection been made with the conductor $L'$, then the illumination of $d'$ would have been increased. This affords a ready means for determining in which line the fault occurs. In case the lines leading from the generator are, for instance, lead-covered cables placed under ground, then the operation will be in the manner now to be described with reference to the generator $A^2$. Conductors 3 and 4 lead, respectively, from the lines $L^3$ and $L^4$ to switch-points $s^3$ and $s^4$ applied to the switch-arms $S'$ and $S^2$. By moving the switches into contact with these points connections will be made from the lines $L^3$ and $L^4$ through the converters $B'$ and $B^2$, respectively. As already seen, the outer casings of the conductors $L^3$ and $L^4$ are at all times connected with the earth, as is diagrammatically indicated by the conductor 9, leading to the earth at $G^2$. In practice it is found that the coverings of the conductors act, in connection with the conductors themselves, as condensers, and that therefore in an alternate-current system there will be a flow of current through an indicator connected in the ordinary way from either conductor to the earth, even when there are no faults and the conductors themselves are well insulated from the earth. In the organization described, however, the equilibrium of the indicating devices $d'$ and $d^2$ is not altered by the condenser effect, since they are similarly related to both conductors and to the earth so long as no earth-connection occurs on the circuits. Should, however, an earth-connection be made, then the corresponding converter will be shunted, as before, and the translating device connected with the other converter will give the proper indication for showing with which conductor the ground-connection has been made.

When the apparatus is not required, the switches $S'$ and $S^2$ may be moved upon their resting contact-points $s\ s$, or the switch $S^5$ may be opened.

I claim as my invention—

1. The combination, with a source of alternating electric currents and lines leading therefrom, of two electric converters, conductors derived from said lines respectively and including such converters and leading to the earth, and an indicating device connected in the secondary circuit of each of said converters.

2. The combination, with a source of alternating electric currents and underground metal-covered lines leading from the respective poles thereof, of two electric converters, means for placing the same in circuit between the respective lines and the earth, and indicating devices connected in the secondary circuits of the respective converters.

In testimony whereof I have hereunto subscribed my name this 4th day of August, A. D. 1887.

OLIVER B. SHALLENBERGER.

Witnesses:
W. D. UPTEGRAFF,
L. B. STILLWELL.